(12) United States Patent
Jezierski et al.

(10) Patent No.: US 8,587,912 B2
(45) Date of Patent: Nov. 19, 2013

(54) ELECTRIC CIRCUIT PROTECTION SYSTEM AND METHOD FOR PROTECTING AN ELECTRIC CIRCUIT

(75) Inventors: Chester Stanley Jezierski, Schenectady, NY (US); Herman Wiegman, Schenectady, NY (US); Suyu Hou, Schenectady, NY (US); Bojan Djokanovic, Erie, PA (US); David Bogdan, Jr., Schenectady, NY (US)

(73) Assignee: General Electric Company, Schenectady, NY (US)

( * ) Notice: Subject to any disclaimer, the term of this patent is extended or adjusted under 35 U.S.C. 154(b) by 448 days.

(21) Appl. No.: 12/909,895

(22) Filed: Oct. 22, 2010

(65) Prior Publication Data

US 2012/0099235 A1   Apr. 26, 2012

(51) Int. Cl.
*H02H 3/08* (2006.01)

(52) U.S. Cl.
USPC .......................................... 361/93.1; 361/93.8

(58) Field of Classification Search
None
See application file for complete search history.

(56) References Cited

U.S. PATENT DOCUMENTS

| | | | |
|---|---|---|---|
| 3,638,157 A | 1/1972 | Kruzic | |
| 3,796,978 A | 3/1974 | Grunert et al. | |
| 3,828,289 A * | 8/1974 | Hickling | 337/5 |
| 5,287,078 A | 2/1994 | Larson | |
| 5,448,442 A | 9/1995 | Farag | |
| 5,488,534 A | 1/1996 | Rau et al. | |
| 5,493,468 A | 2/1996 | Hunter et al. | |
| 5,723,915 A | 3/1998 | Maher et al. | |
| 6,320,486 B1 | 11/2001 | Dietrich et al. | |
| 6,583,977 B1 * | 6/2003 | Oglesbee | 361/104 |
| 7,201,616 B2 | 4/2007 | Smith | |
| 7,538,519 B2 * | 5/2009 | Daou et al. | 320/134 |
| 7,706,116 B2 | 4/2010 | Liu et al. | |
| 2009/0109590 A1 * | 4/2009 | Girot et al. | 361/93.8 |
| 2009/0278404 A1 * | 11/2009 | Finke et al. | 307/9.1 |

FOREIGN PATENT DOCUMENTS

JP   08-236006   *   2/1955   ............. H01H 85/30

* cited by examiner

*Primary Examiner* — Jared Fureman
*Assistant Examiner* — Terrence Willoughby
(74) *Attorney, Agent, or Firm* — GE Global Patent Operation; John A. Kramer (57) ABSTRACT

An electric circuit protection system includes a control module and a circuit sensor communicatively coupled with the control module. The control module is communicatively coupled with a switch that is joined with a circuit having a power source and a fuse. The control module is configured to monitor a degradation factor related to an energy threshold value of the fuse and direct the switch to open the circuit to prevent the power source from supplying current through the fuse. The circuit sensor is configured to measure an energy parameter of the current supplied by the power source through the circuit or that is demanded by a load from the power source. The control module is configured to direct the switch to open the circuit based on the energy threshold value and the energy parameter.

20 Claims, 4 Drawing Sheets

ELECTRIC CIRCUIT PROTECTION SYSTEM AND METHOD FOR PROTECTING AN ELECTRIC CIRCUIT

BACKGROUND

One or more embodiments of the subject matter described herein relate to over current protection devices for electric circuits.

Known electric circuits include a power source that delivers alternating or direct current to an electric load through one or more conductive busses. The current may temporarily and abruptly increase, or "spike," which can cause significant increases in the energy of the current that is transmitted to the load. The variances or spikes in the current may be referred to as an overcurrent, or an overcurrent event. Overcurrent events can damage the load that is powered by the current. For example, the load may include relatively sensitive electronic components that are damaged or destroyed by overcurrents of significantly high energy. Alternatively, the overcurrent events can risk injuring operators of the load.

In order to protect loads from such overcurrents, some known circuits include overcurrent protection devices, such as fuses and contactors, that protect the load and/or operators from overcurrents. The fuses have an energy threshold value that dictates when the fuses fail, or "blow." For example, when the energy of the current in an overcurrent exceeds the energy threshold value of a fuse, the fuse may blow and open the circuit to prevent additional current from flowing to the load. One problem with relying on the energy threshold value of a fuse to protect the load and/or operators of the load is that the energy threshold value may be dependent on external factors, such as the temperature and/or age of the fuse. The fuse may unnecessarily blow at overcurrents having energies that are low enough for the load and/or operators of the load to safely withstand. Additionally, the fuse may be located in a relatively difficult location to reach. As a result, in order to replace the blown fuse, significant downtime of the circuit and load may be required.

Some known contactors operate by opening the circuit when the current exceeds a threshold of the contactor for a predetermined time period. Once the current exceeds the threshold for the time period, the contactor opens to prevent additional current from flowing to the load. One problem with some known contactors is that the contactors have a response time or delay between receiving instructions to open the circuit and actually opening the circuit. During this delay, some current may flow through the contactor to the load and/or fuses located between the contactor and the fuse. This current has energy referred to as "let-through fault energy." The let-through fault energy can degrade fuses that are coupled with the circuit and/or damage or injure the load and operators of the load.

A need exists for an improved electric circuit protection system and method for protecting electric circuits.

BRIEF DESCRIPTION

In one embodiment, an electric circuit protection system is provided. The system includes a control module and a circuit sensor communicatively coupled with the control module. The control module is communicatively coupled with a switch that is joined with a circuit having a power source and a fuse. The control module is configured to monitor a degradation factor related to an energy threshold value of the fuse and direct the switch to open the circuit to prevent the power source from supplying current through the fuse. The circuit sensor is configured to measure an energy parameter of the current supplied by the power source through the circuit or that is demanded by a load from the power source. The control module is configured to direct the switch to open the circuit based on the energy threshold value and the energy parameter.

In another embodiment, a method for protecting an electric circuit is provided. The method includes monitoring a degradation factor of a fuse in the electric circuit to determine an energy threshold value and measuring an energy parameter of current that is supplied to the fuse from a power source. The method also includes opening a switch of the electric circuit to stop a supply of the current from the power source and through the fuse based on the energy threshold value and the energy parameter.

In another embodiment, a non-transitory computer readable storage medium for a control module of an electronic circuit protection system is provided. The storage medium includes instructions to direct the control module to monitor a degradation factor of a fuse in an electric circuit having a power source; determine an energy threshold value of the fuse based on the degradation factor; measure an energy parameter of current supplied to the circuit by the power source; and open a switch of the circuit to stop a supply of the current from the power source based on the energy threshold value and the energy parameter.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
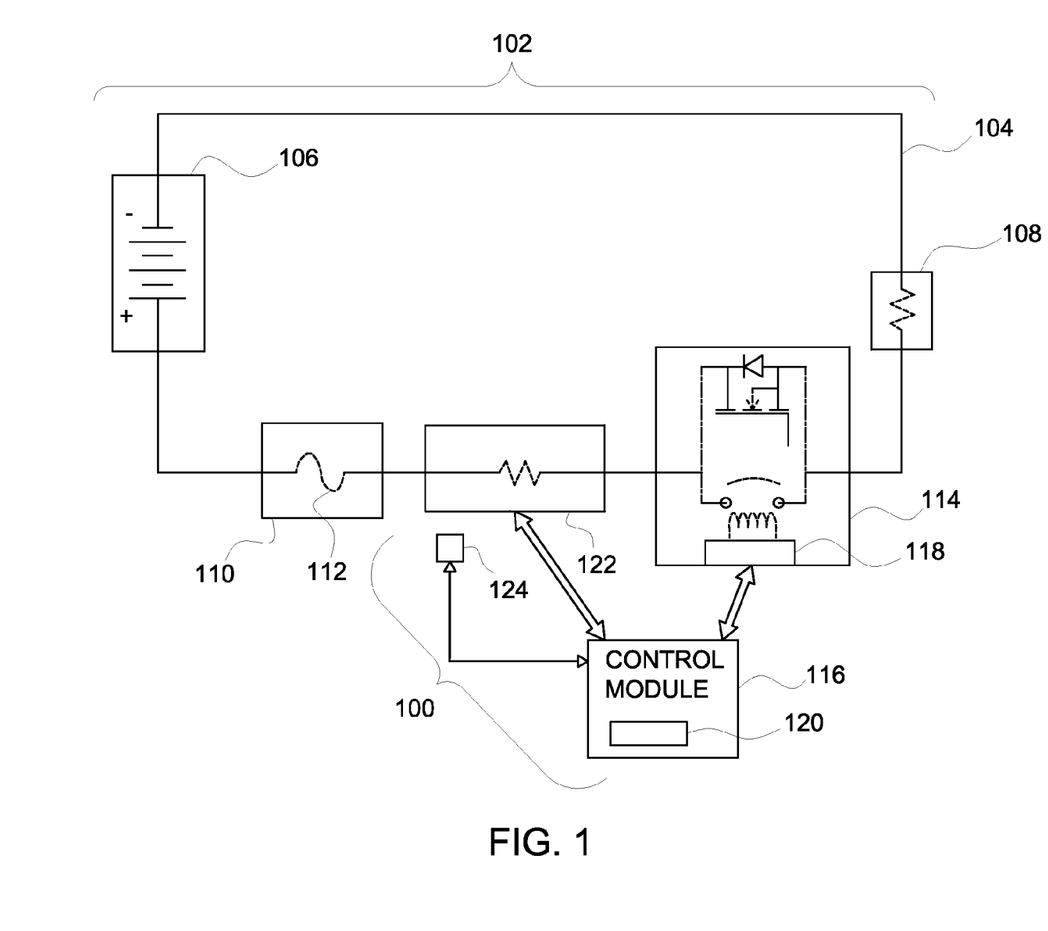
FIG. 1 is a circuit diagram of an electric circuit protection system coupled with an electric circuit in accordance with one embodiment.

One or more embodiments of the subject matter described herein relate to over current protection devices for electric circuits. FIG. 1 is a circuit diagram of an electric circuit protection system 100 coupled with an electric circuit 102 in accordance with one embodiment. The electric circuit 102 includes a conductive bus 104, such as a wire or other conductive body, that electrically couples a power source 106 with an electric load 108. The circuit 102 also includes a fuse assembly 110 and a controlled switch 114 disposed between the power source 106 and the electric load 108. The controlled switch 114 generically shows both an example of an electronic switch, such as a MOSFET, IGBT, MCT, SSR, BJT, SCR or triac, and a mechanical switch, such as a contactor or relay. The protection system 100 monitors one or more degradation factors related to the fuse assembly 110 in order to determine when the switch 114 should be opened in order to prevent blowing the fuse assembly 110 and/or damaging the electric load 108. While only one of each of the protection system 100, circuit 102, bus 104, power source 106, load 108, fuse assembly 110, switch 114 are shown in FIG. 1, alternatively a greater number of one or more of the protection system 100, circuit 102, bus 104, power source 106, load 108, fuse assembly 110, and/or switch 114 may be provided.

In operation, electric current is supplied from the power source 106 to the load 108 through the bus 104. By way of example only, the power source 106 may include one or more of a battery, a generator, an alternator, and/or a power grid that is connected to the bus 104 of the circuit 102. The current supplied by the power source 106 may be direct or alternating current. The load 108 includes a device that receives and/or is powered by the current supplied by the power source 106. The load 108 may operate based on a predetermined range or magnitude of current from the power source 106. For example, the load 108 can be associated with a predetermined threshold that, if exceeded by the current supplied from the power source 106, damages the load 108.

The current is conveyed from the power source 106 to the load 108 through the fuse assembly 110. The fuse assembly 110 includes one or more fuses 112 that are electrically coupled with the bus 104. For example, the fuse assembly 110 may include one or more fuses 112 joined in series and/or in parallel with each other and/or the bus 104. The fuse 112 is a sacrificial overcurrent device of the circuit 102 in that the fuse 112 fails, or "blows," when the current passing through the fuse 112 exceeds an energy threshold value or parameter of the fuse 112. The energy threshold value of the fuse 112 is an operational parameter or index of the fuse 112 that determines when the fuse 112 fails. For example, the energy threshold value may be a current that can safely pass through the fuse 112 without blowing the fuse 112. Alternatively, the energy threshold value may be an energy of current that can safely pass through the fuse 112 without blowing the fuse 112. If the current or energy of the current passing through the fuse 112 exceeds the energy threshold value of the fuse 112, then the fuse 112 may fail and open the circuit 102 to prevent additional current from being delivered to the load 108.

The protection system 100 includes a control module 116 that is communicatively coupled with the switch 114. For example, one or more wired or wireless connections may be provided between the control module 116 and the switch 114 that enables the control module 116 to change a state of the switch 114. The switch 114 changes states between an open state, where the circuit 102 is opened by the switch 114, and a closed state, where the circuit 102 is closed by the switch 114. In one embodiment, the switch 114 may be joined with or include an actuator 118 that receives instructions from the control module 116 and opens or closes the switch 114 in response thereto. Alternatively, the control module 116 may directly open or close the switch 114 by one or more wired or wireless connections.

The switch 114 includes one or more devices that are coupled with the bus 104 and that are capable of opening or closing the circuit 102. By way of example only, the switch 114 may include one or more of a contactor, a relay (such as an electromechanical or solid state relay), a transistor (such as a metal-oxide-semiconductor field effect transistor (MOSFET), an insulated-gate bipolar transistor (IGBT), or a bipolar junction transistor (BJT)), a thyristor (such as a MOS controlled thyristor (MCT) or a silicon-controlled rectifier (SCR)), and/or a triac.

In one embodiment, the control module 116 is a processor based device that operates based on one or more software applications. For example, the control module 116 may include one or more processors, microprocessors, or other logic devices that operate based on instructions stored on a tangible and/or non-transitory computer readable storage medium, such as software applications stored on a memory 120. Alternatively, the control module 116 may be a device that operates on hardwired logic of the control module 116. For example, the control module 116 may include one or more controllers or microcontrollers. The control module 116 can operate based on one or more sets of instructions stored on the memory 120 to monitor changes in the energy threshold value of the fuse 112 and/or determine whether to open the switch 114 to prevent continued flow of current through the fuse 112 in order to prevent the fuse 112 from blowing or degrading and/or to protect the load 108.

The protection system 100 includes sensors 122, 124 that monitor degradation factors related to the fuse 112 and/or energy parameters related to the current supplied by the power source 106. Additional or fewer sensors 122 and/or 124 may be provided than the embodiment shown in FIG. 1. Moreover, one or more of the sensors 122, 124 may be located in other positions within the circuit 102 than the positions shown in FIG. 1.

The degradation factors can include environmental and/or operational conditions. The degradation factors may change the energy threshold value of the fuse. The environmental conditions may include the current conditions to which the fuse is exposed at or about the moment of use. Examples of environmental conditions can include one or more of atmospheric conditions such as ambient temperature, humidity, corona discharge, magnetic flux, vibration, vapors, galvanic effects, ambient pressure, radiation, and the like. Examples of vapors (which can include fumes and other gases) can include solvents, acidic/basic gases, ozone, and the like. In one embodiment, the degradation factors represent the combination of the ambient temperature and the humidity at or near the fuse. As one example, if the ambient temperature around the fuse increases, the energy threshold value of the fuse may decrease and cause the fuse to blow at a lower current. Conversely, as the ambient temperature decreases, the energy threshold value of the fuse may increase and allow larger currents to flow through the fuse without blowing the fuse.

The operational conditions of the degradation factors may include a history of use or operations or of environmental conditions. Examples of operations conditions can include thermal cycling, temperature excursions, age, previous environmental exposures, overcurrent magnitude and/or number of instances, overdischarge magnitude and/or number of instances, vibration, results from system tests, and the like. In one embodiment, the operational conditions can include a stored record of measurements of one or more previous atmospheric conditions and/or overcurrents to which the fuse previously was exposed. The operational conditions may represent degradation of the fuse or a shortening of an expected service life of the fuse. As one example, previous time periods where the fuse was exposed to elevated temperatures may decrease the energy threshold value of the fuse according to a determined schedule or a derived relationship.

Previous currents that passed through the fuse, such as previous events where the current flowing through the fuse exceeded a predetermined degradation threshold of the fuse, may decrease the energy threshold value of the fuse. The degradation threshold of the fuse may be smaller than the energy threshold value of the fuse. The degradation threshold can represent a current that may not cause the fuse to blow within a relatively short time period but degrades the fuse such that the energy threshold value and/or expected service life of the fuse is decreased. Current that passes through the fuse and exceeds the degradation threshold can be referred to as overcurrent. Previous or repeated instances of overcurrent through the fuse may decrease the energy threshold value of the fuse.

In the illustrated embodiment, the protection system 100 includes a current sensor 122 and an environmental sensor 124 that are communicatively coupled with the control module 116 by one or more wired or wireless connections. The current sensor 122 may be electrically joined with the bus 104 between the power source 106 and the toad 108. The current sensor 122 may measure one or more energy parameters of the current supplied by the power source 106 to the load 108 and/or one or more energy parameters of current that is demanded by the load 108. The current sensor 122 reports the energy parameters to the control module 116. For example, the current sensor 122 may include one or more devices that detects the current conveyed through the bus 104 and generates a signal that is based on or proportional to the current. In another example, the current sensor 122 may be communicatively coupled with the load 108 so that the current sensor 122 can determine how much current is demanded by the load 108, such as by receiving a data signal from the load 108 that informs the current sensor 122 when the load 108 is activated and/or how much current is demanded by the load 108. The signal is transmitted to the control module 116 by one or more wired and/or wireless connections. By way of example only, the current sensor 122 may include a current shunt, a current transformer, a Hall effect device, a current clamp sensor, and/or a resistor that is used to measure energy parameters of the current.

"Energy parameter" refers to a measurable factor relating to electrical energy. The energy parameters measured by the current sensor 122 may include or be based on the energy of the current supplied by the power source 106. For example, the energy parameters may be a measurement of the current that is supplied through the bus 104, such as a voltage of a direct current, a frequency of an alternating current, and/or an overcurrent index. In one embodiment, the overcurrent index includes or represents a difference between the current and the degradation threshold of the fuse assembly 110 or the fuse 112. For example, the overcurrent index can be a measurement of the amount that the current exceeds the degradation threshold of the fuse 112.

In another example, the overcurrent index may include or represent a time period that the current exceeds the degradation threshold of the fuse assembly 110 or the fuse 112. The overcurrent index can be a measurement of the time that the current flowing through the fuse 112 exceeded the degradation threshold of the fuse 112 and may have degraded or decreased the energy threshold value of the fuse 112.

The environmental sensor 124 is disposed in a position that allows the environmental sensor 124 to measure one or more environmental conditions at or near the fuse 112. For example, the environmental sensor 124 may include a thermometer positioned to measure the ambient temperature or thermal energy at or around the fuse assembly 110. Alternatively, the environmental sensor 124 may be positioned to measure one or more other environmental conditions, such as the pressure or humidity of the atmosphere surrounding the fuse 112.

The control module 116 acquires or receives the energy parameters from the current sensor 122 and the environmental conditions from the environmental sensor 124. The current sensor 122 may periodically measure the energy parameter and/or the environmental sensor 124 may periodically measure one or more environmental conditions and report the energy parameter and/or environmental conditions to the control module 116. In one embodiment, the control module 116 records or stores previously acquired energy parameters and/or environmental conditions in the memory 120. For example, the control module 116 may store one or more energy parameters and/or environmental conditions as operational conditions to which the fuse 112 has been exposed. As described above, the operational conditions may represent overcurrents and/or previous temperatures to which the fuse 112 was exposed.

The control module 116 examines one or more energy parameters of the current supplied by the power source 106 and one or more degradation factors to determine if the energy threshold value of the fuse 112 has changed and whether the switch 114 is to be opened to protect the load 108 from damage and/or to prevent further degradation or failure of the fuse 112. The energy threshold value of the fuse 112 may vary or change over time based on one or more of the degradation factors. For example, as the ambient temperature around the fuse 112 increases, the energy threshold value of the fuse 112 may decrease and enable the fuse 112 to blow at a lower current. Conversely, as the ambient temperature decreases, the energy threshold value of the fuse 112 may increase and allow larger currents to flow through the fuse 112 without blowing the fuse 112. As another example, a history of relatively frequent or several overcurrents or elevated temperatures to which the fuse 112 was exposed can cause the energy threshold value of the fuse 112 to decrease.

The control module 116 monitors the degradation factors to dynamically adjust the energy threshold value of the fuse 112. The energy threshold value of the fuse 112 may change over time and, as a result, the current energy threshold value may differ from one or more previous energy threshold values of the fuse 112. The control module 116 may dynamically adjust the energy threshold value by calculating changes in the energy threshold value of the fuse 112 as the fuse 112 is exposed to one or more conditions or events that change the energy threshold value. As one example of dynamically adjusting the energy threshold value, the control module 116 may calculate a change in the energy threshold value that is caused by exposure of the fuse 112 to a change in temperature while the fuse 112 is exposed to the change in temperature. As another example, the control module 116 may calculate a change in the energy threshold value that is caused by passage of current through the fuse 112 as the current is passing through the fuse 112. In another example, the control module 116 may calculate a change in the energy threshold value that is caused by an overcurrent flowing through the fuse 112 within a relatively short time period after the overcurrent flows through the fuse 112, such as before a subsequent overcurrent event occurs.

The control module 116 compares the energy parameter of the current that is supplied by the power source 106 to the load 108 through the fuse 112 with the current energy threshold value of the fuse 112. For example, the current sensor 112 may provide the control module 116 with an energy parameter of the current that is flowing through the fuse 112 and the control module 116 compares the energy parameter with the current energy threshold value. The control module 116 compares the energy parameter with the energy threshold value to determine if the fuse 112 is at risk to fail or blow. If the control module 116 determines that the fuse 112 is at risk to fail or blow, the control module 116 directs the switch 114 to open the circuit 102 to prevent continued supply of the current from the power source 106 to the load 108.

In one embodiment, the control module 116 causes the switch 114 to open before the energy parameter of the current flowing through the fuse 112 exceeds the current energy threshold value of the fuse 112. For example, the control module 116 may open the switch 114 when the energy parameter of the current flowing through the fuse 112 exceeds a safety threshold of the fuse 112. The safety threshold may be lower than the energy threshold value of the fuse 112. For example, the safety threshold may be a percentage of the current energy threshold value of the fuse 112, such as 99%, 95%, 90%, 85%, 80%, 75%, and the like. Selection of the appropriate safety threshold may be made based on one or more of the intended use, industry practice, governmental regulations, certification requirements, customer reliability needs, and the like. When the energy parameter of the current flowing through the bus 104 exceeds the safety threshold of the fuse 112, the control module 116 directs the switch 114 to open the circuit 102 to avoid further degrading or blowing the fuse 112.

Figure 2:
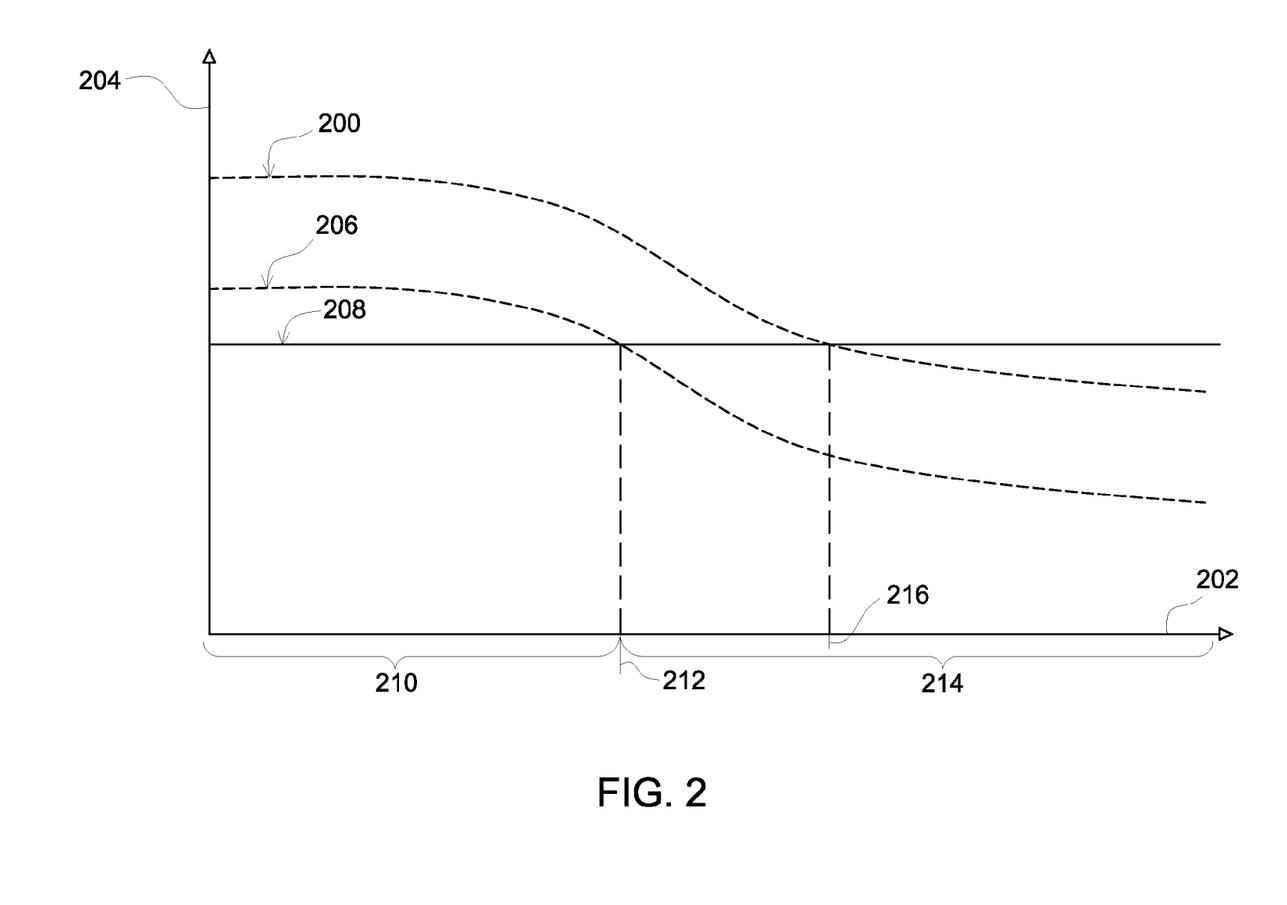
FIG. 2 illustrates an energy threshold value of a fuse shown in FIG. 1 changing over time in accordance with one embodiment.

FIG. 2 illustrates an energy threshold value 200 of the fuse 112 (shown in FIG. 1) changing over time in accordance with one embodiment. The energy threshold 200 of the fuse 112 is shown alongside a horizontal axis 202 that represents time and a vertical axis 204 that represents an energy parameter of electric current, such as watts (which may represent power of the current) or joules (which may represent energy of the current) or amps (which may represent the current) or volts (which may represent the electromotive force of the current). A safety threshold 206 of the fuse 112 is shown below the energy threshold value 200. As shown in FIG. 2, the safety threshold 206 is a fraction of the energy threshold value 200, such as 80% of the energy threshold value 200.

The energy and safety thresholds 200, 206 may change over time due to changing environmental conditions and/or degradation of the fuse 112 (shown in FIG. 1). An energy parameter 208 of the current supplied by the power source 106 (shown in FIG. 1) to the bus 104 (shown in FIG. 1) is shown next to the energy and safety thresholds 200, 206. While the energy parameter 208 is shown as being approximately constant with respect to time, alternatively, the energy parameter 208 may vary with respect to time.

In the illustrated embodiment, the changing energy and safety thresholds 200, 206 demonstrate how the protection system 100 (shown in FIG. 1) can protect a fuse 112 (shown in FIG. 1) from blowing. For example, during an initial time period 210, the energy parameter 208 of the current flowing through the fuse 112 is smaller than the energy and safety thresholds 200, 206. As a result, the control module 116 (shown in FIG. 1) determines that the current can continue flowing through the fuse 112 without significant risk of the fuse 112 blowing.

Due to degradation of the fuse 112 (shown in FIG. 1) and/or other environmental or operational conditions of the fuse 112 (such as changing ambient temperatures), the energy and safety thresholds 200, 206 may gradually decrease. The energy and/or safety thresholds 200, 206 may decrease such that the energy parameter 208 of the current exceeds one or more of the energy and/or safety thresholds 200, 206. For example, at a switchover time 212, the control module 116 (shown in FIG. 1) determines that the energy parameter 208 of the current exceeds the safety threshold 206 of the fuse 112. As a result, the control module 116 may direct the switch 114 (shown in FIG. 1) to open the circuit 102 (shown in FIG. 1) at the switchover time 212. Consequently, during a subsequent time period 214, the circuit 102 is open and current does not flow from the power source 106 (shown in FIG. 1) to the load 108 (shown in FIG. 1) through the fuse 112.

As shown in FIG. 2, the energy parameter 208 would have exceeded both the energy and safety thresholds 200, 206 of the fuse 112 (shown in FIG. 1) at a failure time 216 if the control module 116 (shown in FIG. 1) did not direct the switch 114 (shown in FIG. 1) to open the circuit 102 (shown in FIG. 1). The fuse 112 may have blown at the failure time 216 if the control module 116 did not open the circuit 102 prior to the failure time 216. As a result, the fuse 112 may have failed and required replacement. By monitoring the degradation factors of the fuse 112 and energy parameters of the current flowing through the fuse 112, the control module 116 is able to open the circuit 102 prior to blowing the fuse 112, thereby reducing down time and/or repair expenses for a device that includes the circuit 102 and/or load 108 (shown in FIG. 1).

Figure 3:
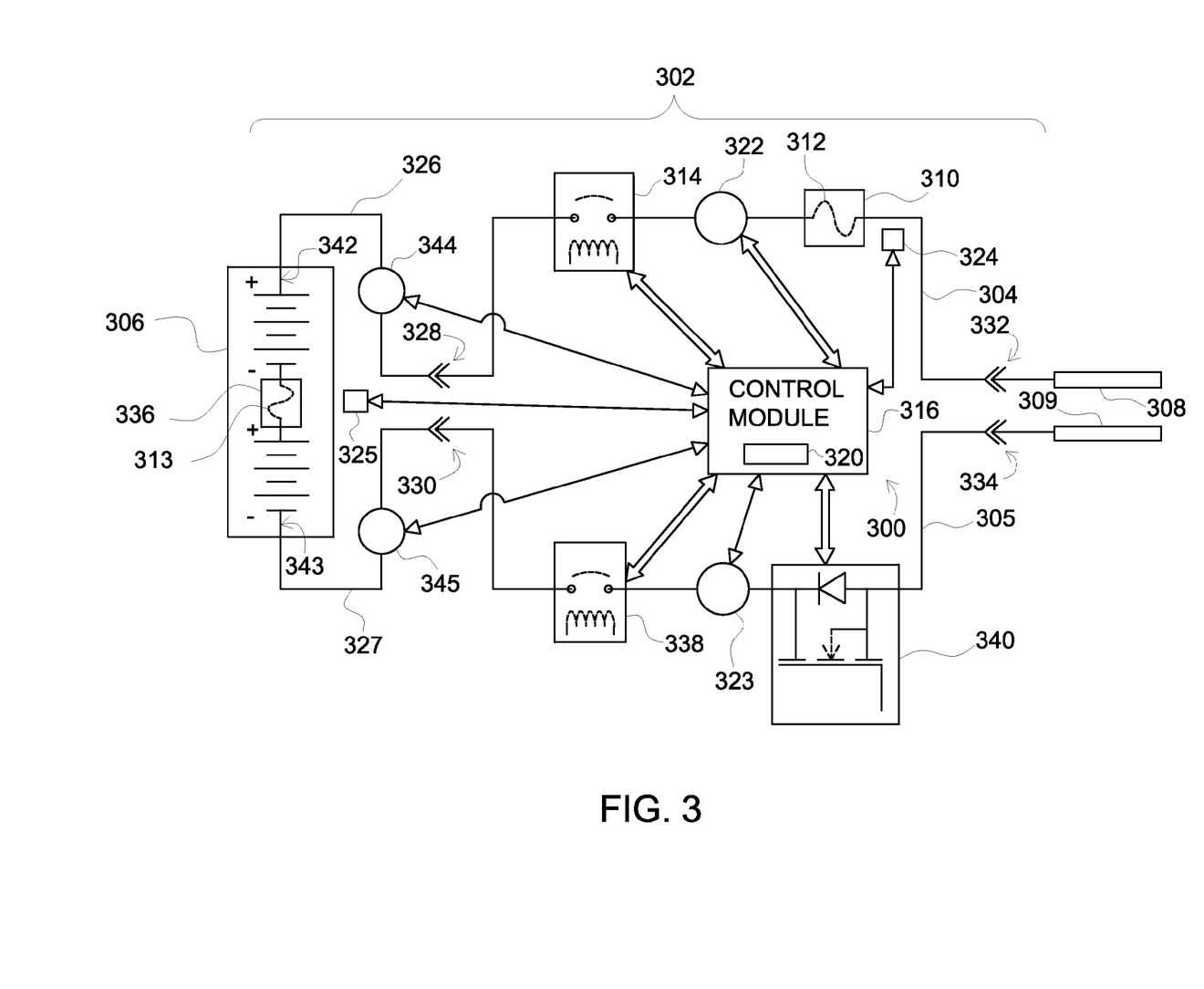
FIG. 3 is a circuit diagram of an electric circuit protection system coupled with an electric circuit in accordance with another embodiment.

FIG. 3 is a circuit diagram of an electric circuit protection system 300 coupled with an electric circuit 302 in accordance with another embodiment. The electric circuit 302 includes conductive busses 304, 305, 326, 327, such as wires or other conductive bodies, that electrically couple a power source 306 with external busses 308, 309. The busses 304, 326 are electrically coupled by a connector 328 and the busses 305, 327 are electrically coupled by a connector 330. In the illustrated embodiment, the busses 304, 326 are coupled with a positive terminal 342 of the power source 306 and the busses 305, 327 are coupled with a negative terminal 343 of the power source 306. The busses 304, 305 are electrically coupled with the external busses 308, 309 by connectors 332, 334. The external bus 308, 309 may include or be electrically coupled with an electric load, such as the load 108 (shown in FIG. 1).

The circuit 302 includes an external fuse assembly 310 and an internal fuse assembly 336. The internal fuse assembly 336 is disposed within the power source 306 in the illustrated embodiment. For example, the power source 306 may include the internal fuse assembly 336 to provide additional protection to the circuit 302 and external busses 308, 309. Similar to the fuse assembly 110 (shown in FIG. 1), the fuse assemblies 310, 336 include fuses 312, 313. The fuses 312, 313 of the different fuse assemblies 310, 336 may have different energy and/or safety thresholds. Alternatively, the fuses 312, 313 have approximately the same energy and/or safety thresholds.

The circuit 302 also includes several controlled switches 314, 338, 340 disposed between the power source 306 and the external busses 308, 309. Similar to the protection system 100 (shown in FIG. 1), the protection system 300 may monitor one or more degradation factors related to the fuse assemblies 310, 336 in order to determine when one or more of the switches 314, 338, 340 should be opened in order to prevent blowing the fuse assembly 310 or 336 and/or damaging an electric load joined with the external busses 308, 309. The number of components shown in FIG. 3 is provided merely as an example. Additional or fewer components may be provided.

The protection system 300 includes a control module 316 that may be similar to the control module 116 (shown in FIG. 1). The control module 316 is communicatively coupled with the switches 314, 338, 340 and is able to individually change the open or closed state of one or more of the switches 314, 338, 340. In the illustrated embodiment, the switch 314 includes a positive terminal contactor coupled with the bus 304, the switch 338 includes a negative terminal contactor coupled with the bus 305, and the switch 340 includes a MOSFET coupled with the bus 305. Alternatively, one or more different switches may be used and/or located in different positions within the circuit 302.

Similar to the protection system 100 (shown in FIG. 1), the protection system 300 includes current sensors 322, 323, 344, 345 and environmental sensors 324, 325 that monitor degradation factors of the fuses 312, 313 and/or energy parameters of the current conveyed through the busses 304, 305, 326, 327. For example, the current sensors 322, 323, 344, 345 and the environmental sensors 324, 325 may monitor historical and current degradation factors and/or energy parameters of the current similar to as described above in connection with the current sensor 122 (shown in FIG. 1) and the environmental sensor 124 (shown in FIG. 1). Additional or fewer sensors 322, 323, 324, 325, 344, 345 may be provided than the embodiment shown in FIG. 3. Moreover, one or more of the sensors 322, 323, 324, 325, 344, 345 may be located in other positions than the illustrated positions.

The control module 316 acquires or receives the energy parameters from one or more of the current sensors 322, 323, 344, 345 and the environmental conditions from the environmental sensors 324, 325. The environmental sensor 324 may provide measurements of the environmental conditions related to the fuse 312 while the environmental sensor 325 provides measurements of the environmental conditions related to the fuse 313. Similar to the control module 116 (shown in FIG. 1), the control module 316 examines one or more energy parameters of the current supplied by the power source 306 and one or more degradation factors to determine if the energy threshold value of the fuse 312 and/or the fuse 313 has changed and whether one or more of the switches 314, 338, 340 is to be opened to protect the load coupled to the external busses 308, 309 from damage.

The control module 316 may include a memory 320 that is similar to the memory 120 (shown in FIG. 1). The control module 316 can store relative locations of the sensors 322, 323, 324, 325, 344, 345, fuses 312, 313, and the switches 314, 338, 340 in the memory 320. For example, the control module 316 may store the location of the current sensor 322 as being between the switch 314 and the fuse 312 with the current sensor 322 located downstream of the switch 314 and upstream of the fuse 312 along the path that current flows through the bus 304. The location of the current sensor 323 is between the switch 338 and the switch 340 with the current sensor 323 downstream of the switch 338 and upstream of the switch 340 along the path that current flows through the bus 305. The location of the current sensor 344 is between the power source 306 and the switch 314 with the current sensor 344 downstream of the power source 306 and upstream of the switch 314 along the path that current flows through the bus 326. The location of the current sensor 345 is between the power source 306 and the switch 338 with the current sensor 345 downstream of the power source 306 and upstream of the switch 338 along the path that current flows through the bus 327. The location of the environmental sensor 324 is at or near the fuse 312 while the location of the environmental sensor 325 is at or near the fuse 313.

In one embodiment, the control module 316 uses the locations of the sensors 322, 323, 324, 325, 344, 345 to determine which switches 314, 338, and/or 340 is to be opened. For example, based on the degradation factors of the fuses 312, 313, the energy parameter(s) of the current supplied by the power source 306, and/or the locations of the sensors 322, 323, 324, 325, 344, 345, fuses 312, 313, and/or the switches 314, 338, 340, the control module 316 determines which of the switches 314, 338, 340 is opened when an overcurrent occurs. For example, if the current sensor 344 detects an energy parameter of the current that exceeds the safety and/or energy threshold value of the fuse 312, then the control module 316 may open the switch 314 to prevent the fuse 312 from blowing while leaving the other switches 338, 340 closed. Alternatively, the control module 316 may direct more of the switches 338, 340 to open.

In another example, if the current sensor 344 detects an energy parameter of the current that exceeds the safety threshold and/or energy threshold value of the fuse 312 but the current sensor 322 detects an energy threshold value that does not exceed the safety threshold and/or energy threshold value, then the control module 316 may not open the switch 314. The current sensor 344 is located upstream of the current sensor 322 in the direction that current flows through the busses 304, 326. The energy of the current may have decreased from the location of the current sensor 344 to the location of the current sensor 322, thereby making opening of the circuit 302 unnecessary.

The control module 316 may open the switches 314, 338 to isolate the power source 306 if the control module 316 determines that the current flowing through the fuse 313 in the power source 306 has an energy that is approaching or exceeding the safety threshold and/or energy threshold value of the fuse 313. For example, the environmental sensor 325 may determine that the fuse 313 is exposed to relatively high temperatures and, as a result, the control module 316 may adjust the safety threshold and/or energy threshold value of the fuse 313. If the energy parameter of the current flowing through the power source 306 exceeds the adjusted safety threshold and/or energy threshold value, then the control module 316 may open both switches 314, 338.

In another example, the control module 316 may open the switches 338, 340 that are not disposed along the same conductive bus 305 as the fuse 312. If the current sensors 345 and/or 323 detect an energy threshold value that exceeds the adjusted safety threshold and/or energy threshold value of the fuse 312 and/or an energy and/or safety threshold of a fuse or load coupled with the external busses 308, 309, then the control module 316 may open one or more of the switches 338, 340 to prevent current from flowing to the busses 308, 309.

Figure 4:
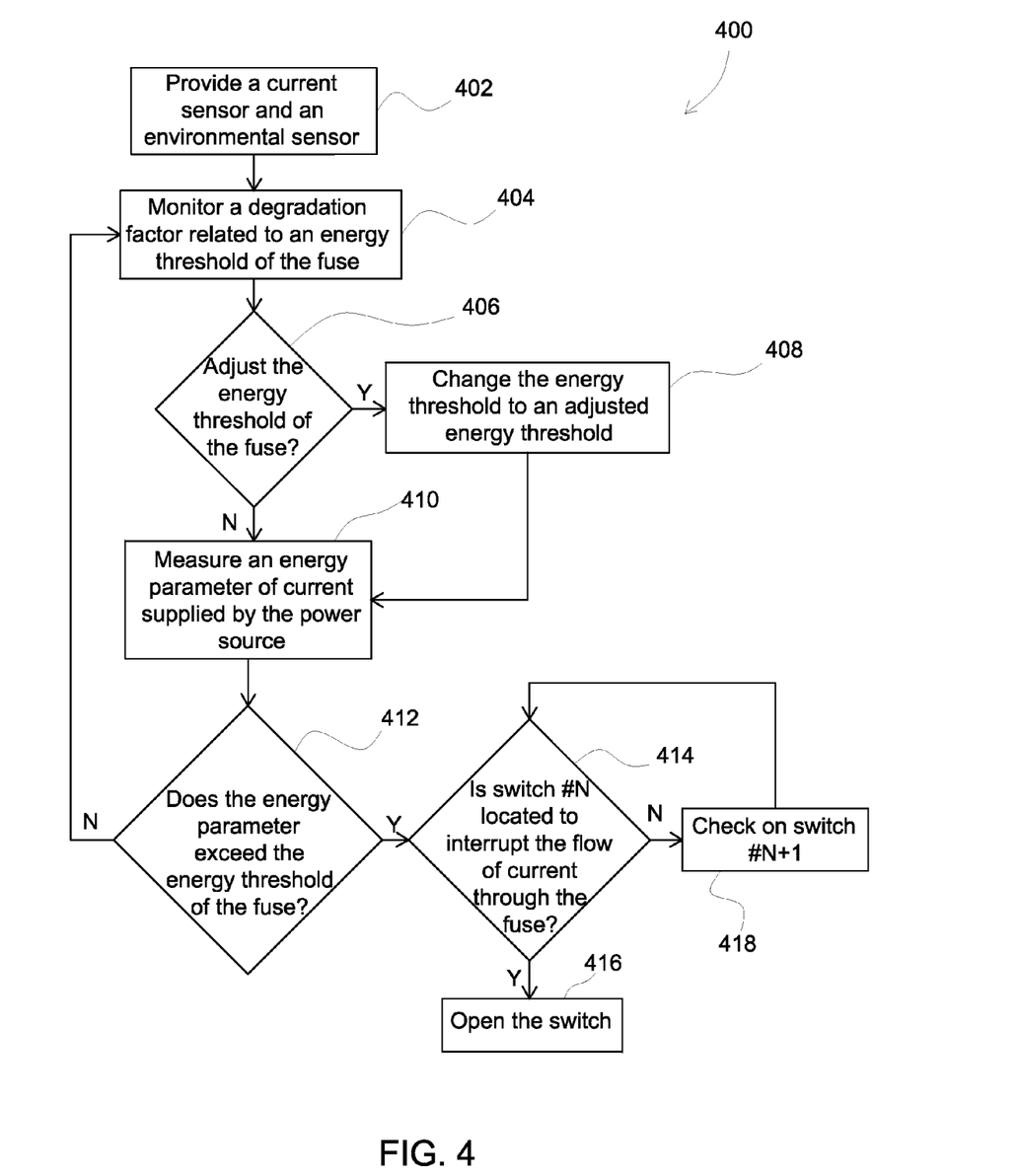
FIG. 4 is a flowchart of a method for protecting an electric circuit in accordance with one embodiment.

FIG. 4 is a flowchart of a method 400 for protecting an electric circuit in accordance with one embodiment. The method 400 may be used in conjunction with one or more of the protection systems 100, 300 (shown in FIGS. 1 and 3) to monitor varying energy threshold values of the fuses 112, 312, 313 (shown in FIGS. 1 and 3) and prevent the fuses 112, 312, 313 from blowing while protecting electric loads, such as the load 108 (shown in FIG. 1) and a load coupled with the external busses 308, 309 (shown in FIG. 3). For example, one or more operations described in connection with FIG. 4 may be implemented by the control module 116 and/or 316 (shown in FIGS. 1 and 3) to monitor changes in the energy threshold value of the fuses 112, 312, 313 and/or determine which switches 114, 314, 338, 340 (shown in FIGS. 1 and 3) are to be opened to prevent the fuse 112, 312, and/or 313 from blowing and/or to protect the load 108 or a load coupled with the external busses 308, 309. In one embodiment, the method 400 allows the energy threshold values of the fuses 112, 312, 313 to be monitored and dynamically updated based on changes in the environmental and/or operational conditions to which the fuses 112, 312, 313 are exposed. For example, the method 400 may proceed in a loop-wise manner to repeatedly adjust the energy threshold values of the fuses 112, 312, 313 based on degradation factors of the fuses 112, 312, 313 that vary or change over time. One example of dynamically adjusting the energy threshold of one or more fuses is presented by the operations described in connection with 404, 406, 408, 410 and 412 of the method 400.

At 402, a current sensor and an environmental sensor are provided. The current sensor may be electrically coupled with a power source and a fuse of the circuit being protected, such as the current sensor 122, 322, 323, 344, 345 (shown in FIGS. 1 and 3). The current sensor measures one or more energy parameters of the current that is supplied by the power source and/or one or more operational conditions of the fuse. The environmental sensor is positioned to measure one or more environmental conditions at or near the fuse. For example, the environmental sensor 124, 324, and/or 325 (shown in FIGS. 1 and 3) may measure the ambient temperature, shock level or vibration, humidity, or gas composition at or around the fuse.

At 404, a degradation factor related to an energy threshold value of the fuse is monitored. For example, the environmental sensor may obtain measurements of environmental conditions such as the ambient temperature around the fuse. The current sensor may obtain operational conditions such as measurements of overcurrents that flow through the fuse. As described above, the environmental and/or operational conditions may be used to determine if the energy threshold value of the fuse changes.

At 406, a determination is made as to whether the energy threshold value of the fuse needs to be adjusted. For example, the degradation factors such as the environmental conditions to which the fuse is exposed, the operational conditions under which the fuse previously operated or currently is operating, and/or a history of environmental and/or operational conditions may be considered in order to determine if the fuse has degraded. As described above, increased temperatures around the fuse and/or a history of overcurrents through the fuse may decrease the energy threshold value of the fuse. Conversely, decreased temperatures around the fuse may increase the energy threshold value of the fuse. If the degradation factors indicate that the energy threshold value of the fuse has changed, then flow of the method 400 proceeds to 408. Alternatively, if the degradation factors do not indicate that the energy threshold value has changed, then flow of the method 400 proceeds to 410.

At 408, the energy threshold value of the fuse is adjusted. For example, the energy threshold value of the fuse may be decreased if the fuse currently is exposed to elevated temperatures and/or the fuse has been exposed to a history of relatively frequent overcurrents and/or a history of elevated temperatures. Conversely, the energy threshold value may be increased if the fuse currently is exposed to reduced temperatures.

At 410, one or more energy parameters of the current supplied by the power source are measured. As described above, the energy parameters may represent the energy of the current and the energy that may pass through the fuse. The current sensor can measure the energy parameters. For example, one or more of the current sensors 122, 322, 323, 344, 345 (shown in FIGS. 1 and 3) may measure the energy parameters.

At 412, the one or more energy parameters of the current are compared to the energy threshold value of the fuse. The energy parameter may be compared to the adjusted energy threshold value of the fuse if the previous energy threshold value of the fuse was changed at 408. A determination is made as to whether the one or more energy parameters of the current exceed the energy threshold value of the fuse. If the one or more energy parameters exceed the energy threshold value, then the energy parameters may indicate that the current has sufficiently high energy that flow of the current through the fuse may cause the fuse to blow. As a result, flow of the method 400 proceeds to 414. Alternatively, if the one or more energy parameters do not exceed the energy threshold value, then the energy parameters may indicate that the current does not have sufficiently high energy to risk blowing the fuse. As a result, flow of the method 400 returns to 404. For example, the method 400 may return to 404 and continue in a loop-wise manner to determine if the energy threshold value of the fuse needs to be adjusted, as described above.

Noting that there is a switch located in the circuit that includes the fuse, at 414, a determination is made as to whether to open the switch to prevent current flow through the fuse. For example, if multiple switches are provided in the circuit that includes the fuse, at 414, a determination may be made as to whether a first one of the switches (or "switch #N") is located in the circuit in a position that the first switch could open the circuit and prevent flow of the current through the fuse. If the switch is positioned to interrupt or prevent flow of the current through the fuse, then flow of the method 400 proceeds to 416. Alternatively, if the switch is not positioned to interrupt or prevent flow of the current through the fuse, then flow of the method 400 proceeds to 418. If an optional PTC switch is located in the circuit, the open/close status of the PTC switch may be used to determine whether to open any other switch. PTC stands for positive temperature coefficient, and a PTC switch will lose the ability to conduct electricity above a certain temperature and/or will increase electrical resistivity in proportion to the temperature of the PTC material.

At 416, the switch is opened. For example, the switch that is positioned to interrupt or prevent flow of the current through the fuse is opened to open the circuit and stop flow of the current through the fuse.

At 418, a different switch is checked or examined. For example, if the first switch is not positioned to open the circuit and interrupt flow of the current through the fuse, then the next switch (or "switch #N+1") is examined by the method 400. Flow of the method 400 returns to 414, where the next switch, or switch #N+1, is examined. For example, the next switch is examined at 414 to determine if the switch is positioned to be opened and prevent flow of the current through the fuse.

In one embodiment, an electric circuit protection system includes a control module that is communicatively coupled with a switch. The switch is joined with a circuit having a power source and a fuse. The control module determines or maintains to an energy threshold value of the fuse based on a degradation factor. The control module responds to a supply of current from the power source (or a demand for a supply of current from the power source) that is greater than the energy threshold value by directing the switch to open the circuit. Opening the switch may prevent the power source from supplying current through the fuse that is greater than the energy threshold value. A circuit sensor is communicatively coupled with the control module and measures an energy parameter of the current supplied by the power source through the circuit.

In one aspect, an electric circuit protection system includes a control module and a circuit sensor communicatively coupled with the control module. The control module is communicatively coupled with a switch that is joined with a circuit having a power source and a fuse. The control module is configured to monitor a degradation factor related to an energy threshold value of the fuse and direct the switch to open the circuit to prevent the power source from supplying current through the fuse. The circuit sensor is configured to measure an energy parameter of the current supplied by the power source through the circuit or that is demanded by a load module from the power source. The control module is configured to direct the switch to open the circuit based on the energy threshold value and the energy parameter.

In another aspect, the control module is configured to dynamically adjust the energy threshold value of the fuse based on one or more changes in the degradation factor.

In another aspect, the control module monitors one or more operational or environmental conditions as the degradation factor and calculates the energy threshold value of the fuse based on the degradation factor.

In another aspect, the system also includes an environmental sensor communicatively coupled with the control module.

The environmental sensor is configured to measure an environmental condition at or near the fuse with the degradation factor being based on the environmental condition.

In another aspect, the circuit sensor is configured to measure at least one of an energy value or an overcurrent index of the current supplied by the power source as the energy parameter.

In another aspect, the overcurrent index represents at least one of an amount that the current supplied by the power source exceeds a predetermined degradation threshold of the fuse or a time period that the current exceeds the degradation threshold.

In another aspect, the control module is communicatively coupled with a plurality of circuit sensors disposed at different locations proximate to the circuit and configured to measure respective plural energy parameters. The control module is configured to direct the switch to open the circuit based on the locations of the circuit sensors and the energy parameters.

In another aspect, the control module is configured to determine the energy threshold value based on a history of one or more environmental conditions or overcurrents to which the fuse has been exposed.

In another embodiment, a method for protecting an electric circuit includes monitoring a degradation factor of a fuse in the electric circuit to determine an energy threshold value; measuring an energy parameter of current that is supplied to the fuse from a power source; and opening a switch of the electric circuit to stop a supply of the current from the power source and through the fuse based on the energy threshold value and the energy parameter.

In another aspect, the method also includes modifying the energy threshold value of the fuse based on a change in the degradation factor.

In another aspect, the monitoring step includes monitoring one or more operational or environmental conditions that changes the energy threshold value of the fuse.

In another aspect, the measuring step includes measuring at least one of an energy value or an overcurrent index of the current supplied by the power source as the energy parameter.

In another aspect, the overcurrent index represents at least one of an amount that the current supplied by the power source exceeds a predetermined degradation threshold of the fuse or a time period that the current exceeds the degradation threshold.

In another aspect, the measuring step includes measuring a plurality of energy parameters of the current that is supplied to the fuse from the power source at a plurality of different locations proximate to the circuit, the opening step including opening the switch based on the locations at which the energy parameters are measured.

In another aspect, the monitoring step includes monitoring a history of one or more environmental conditions or overcurrents to which the fuse has been exposed.

In another embodiment, a non-transitory computer readable storage medium for a control module of an electronic circuit protection system is provided. The storage medium includes instructions to direct the control module to monitor a degradation factor of a fuse in an electric circuit having a power source; determine an energy threshold value of the fuse based on the degradation factor; measure an energy parameter of current supplied to the circuit by the power source; and open a switch of the circuit to stop a supply of the current from the power source based on the energy threshold value and the energy parameter.

In another aspect, the instructions direct the control module to dynamically adjust the energy threshold value of the fuse based on one or more changes in the degradation factor.

In another aspect, the instructions direct the control module to monitor one or more operational or environmental conditions that change the energy threshold value of the fuse as the degradation factor.

In another aspect, the instructions direct the control module to measure a plurality of energy parameters of the current supplied to the circuit by the power source at a plurality of different locations proximate to the circuit and to determine when to open the switch based on the locations at which the energy parameters are measured.

In another aspect, the instructions direct the control module to monitor a history of one or more environmental conditions or overcurrents to which the fuse has been exposed and determine when to open the switch based on the history.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter disclosed herein without departing from its scope. While the dimensions and types of materials described herein are intended to define the parameters of the one or more embodiments of the subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the described subject matter, including the best mode, and also to enable a person of ordinary skill in the art to practice the embodiments disclosed herein, including making and using any devices or systems and performing the methods. The patentable scope of the subject matter is defined by the claims, and may include other examples that occur to those of ordinary skill in the art. Such other examples are within the scope of the claims if they have structural elements that do not differ from the literal language of the claims, or if they include equivalent structural elements with insubstantial differences from the literal language of the claims.

The foregoing description of certain embodiments of the disclosed subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Unless explicitly stated to the contrary, embodiments "comprising," "including," or "having" an element or a plurality of elements having a particular property may include additional such elements not having that property.

What is claimed is:

1. An electric circuit protection system comprising:
a control module communicatively coupled with a switch that is joined with a circuit having a power source and a fuse, the control module configured to monitor a degradation factor related to an energy threshold value of the fuse that changes over time, and the control module further configured to direct the switch to open the circuit to prevent the power source from supplying current through the fuse; and
a circuit sensor communicatively coupled with the control module and configured to measure an energy parameter of the current that is supplied by the power source through the circuit or demanded by an electric load from the power source, and the control module is configured to direct the switch to open the circuit based on the energy threshold value and the energy parameter.

2. An electric circuit protection system comprising:
a control module communicatively coupled with a switch that is joined with a circuit having a power source and a fuse, the control module configured to monitor a degradation factor related to an energy threshold value of the fuse, and the control module further configured to direct the switch to open the circuit to prevent the power source from supplying current through the fuse; and
a circuit sensor communicatively coupled with the control module and configured to measure an energy parameter of the current that is supplied by the Dower source through the circuit or demanded by an electric load from the power source, and the control module is configured to direct the switch to open the circuit based on the energy threshold value and the energy parameter, wherein the control module is configured to dynamically adjust the energy threshold value of the fuse based on one or more changes in the degradation factor.

3. An electric circuit protection system comprising:
a control module communicatively coupled with a switch that is joined with a circuit having a power source and a fuse, the control module configured to monitor a degradation factor related to an energy threshold value of the fuse, and the control module further configured to direct the switch to open the circuit to prevent the power source from supplying current through the fuse; and
a circuit sensor communicatively coupled with the control module and configured to measure an energy parameter of the current that is supplied by the power source through the circuit or demanded by an electric load from the power source, and the control module is configured to direct the switch to open the circuit based on the energy threshold value and the energy parameter, wherein the control module monitors one or more operational or environmental conditions as the degradation factor and calculates the energy threshold value of the fuse based on the degradation factor.

4. The system of claim 1, further comprising an environmental sensor communicatively coupled with the control module, the environmental sensor configured to measure an environmental condition at or near the fuse, and the degradation factor is based on the environmental condition.

5. The system of claim 1, wherein the circuit sensor is configured to measure at least one of an energy value or an overcurrent index of the current supplied by the power source as the energy parameter.

6. The system of claim 5, wherein the overcurrent index represents at least one of an amount that the current supplied by the power source exceeds a predetermined degradation threshold of the fuse or a time period that the current exceeds the degradation threshold.

7. The system of claim 1, wherein the control module is communicatively coupled with a plurality of circuit sensors disposed at different locations proximate to the circuit and configured to measure respective plural energy parameters, the control module configured to direct the switch to open the circuit based on the locations of the circuit sensors and the energy parameters.

8. The system of claim 1, wherein the control module is configured to determine the energy threshold value based on a history of one or more environmental conditions or overcurrents to which the fuse has been exposed.

9. A method for protecting an electric circuit, the method comprising:
monitoring a degradation factor of a fuse in the electric circuit to determine an energy threshold value of the fuse that changes over time;
measuring an energy parameter of current that is supplied to the fuse from a power source; and
opening a switch of the electric circuit to stop supply of the current from the power source and through the fuse based on the energy threshold value and the energy parameter.

10. A method for protecting an electric circuit, the method comprising:
monitoring a degradation factor of a fuse in the electric circuit to determine an energy threshold value of the fuse;
measuring an energy parameter of current that is supplied to the fuse from a power source;
opening a switch of the electric circuit to stop supply of the current from the power source and through the fuse based on the energy threshold value and the energy parameter; and
modifying the energy threshold value of the fuse based on a change in the degradation factor.

11. A method for protecting an electric circuit, the method comprising:
monitoring a degradation factor of a fuse in the electric circuit to determine an energy threshold value of the fuse;
measuring an energy parameter of current that is supplied to the fuse from a power source;
opening a switch of the electric circuit to stop supply of the current from the power source and through the fuse based on the energy threshold value and the energy parameter, wherein the monitoring step includes monitoring one or more operational or environmental conditions that change the energy threshold value of the fuse.

12. The method of claim 9, wherein the measuring step includes measuring at least one of an energy value or an overcurrent index of the current supplied by the power source as the energy parameter.

13. The method of claim 12, wherein the overcurrent index represents at least one of an amount that the current supplied by the power source exceeds a predetermined degradation threshold of the fuse or a time period that the current exceeds the degradation threshold.

14. The method of claim 9, wherein the measuring step includes measuring a plurality of energy parameters of the current that is supplied to the fuse from the power source at a plurality of different locations proximate to the circuit, the opening step including opening the switch based on the locations at which the energy parameters are measured.

15. The method of claim 9, wherein the monitoring step includes monitoring a history of one or more environmental conditions or overcurrents to which the fuse has been exposed.

16. A non-transitory computer readable storage medium for a control module of an electronic circuit protection system, the storage medium including instructions to direct the control module to:
   monitor a degradation factor of a fuse in an electric circuit having a power source;
   determine an energy threshold value of the fuse that changes over time based on the degradation factor;
   measure an energy parameter of current supplied to the circuit by the power source; and
   open a switch of the circuit to stop a supply of the current from the power source based on the energy threshold value and the energy parameter.

17. A non-transitory computer readable storage medium for a control module of an electronic circuit protection system, the storage medium including instructions to direct the control module to:
   monitor a degradation factor of a fuse in an electric circuit having a power source;
   determine an energy threshold value of the fuse based on the degradation factor;
   measure an energy parameter of current supplied to the circuit by the power source; and
   open a switch of the circuit to stop a supply of the current from the power source based on the energy threshold value and the energy parameter, wherein the instructions also direct the control module to dynamically adjust the energy threshold value of the fuse based on one or more changes in the degradation factor.

18. A non-transitory computer readable storage medium for a control module of an electronic circuit protection system, the storage medium including instructions to direct the control module to:
   monitor a degradation factor of a fuse in an electric circuit having a power source;
   determine an energy threshold value of the fuse based on the degradation factor;
   measure an energy parameter of current supplied to the circuit by the power source; and
   open a switch of the circuit to stop a supply of the current from the power source based on the energy threshold value and the energy parameter, wherein the instructions also direct the control module to monitor one or more operational or environmental conditions that change the energy threshold value of the fuse as the degradation factor.

19. The computer readable storage medium of claim 16, wherein the instructions direct the control module to:
   measure a plurality of energy parameters of the current supplied to the circuit by the power source at a plurality of different locations proximate to the circuit; and
   determine when to open the switch based on the locations at which the energy parameters are measured.

20. The computer readable storage medium of claim 16, wherein the instructions direct the control module to monitor a history of one or more environmental conditions or overcurrents to which the fuse has been exposed and determine when to open the switch based on the history.

* * * * *